United States Patent Office 2,996,430
Patented Aug. 15, 1961

2,996,430
SYNTHETIC ION EXCHANGE RESIN RECOVERY OF VITAMIN $B_{12}$ VALUES
Edwin N. Lightfoot, Jr., Brooklyn, N.Y., assignor to Chas. Pfizer & Co., Inc., New York, N.Y., a corporation of Delaware
No Drawing. Filed May 20, 1952, Ser. No. 288,951
4 Claims. (Cl. 167—81)

This invention is concerned with an improved method for the recovery of certain vitamin products, particularly vitamin $B_{12}$ values.

Vitamin $B_{12}$ is a highly active therapeutic compound which is present in various animal organs, as well as in certain microorganism fermentation products. It occurs in very low concentration in these sources and its isolation or recovery in purified form offers many difficulties.

We have found that vitamin $B_{12}$ values, that is $B_{12}$ itself and related biologically active compounds like vitamin $B_{12b}$, may be concentrated and purified in a particularly efficient manner by contacting impure, acidic aqueous solutions of them with certain synthetic ion exchange resins. Such resins are peculiarly specific in their adsorption of these vitamin values. They are a special type having carboxyl groups as the principal, active exchange radicals and being prepared by copolymerization of acrylic acid with divinyl benzene. Definite proportions of the acid and divinyl benzene are essential in order that a resin having suitable $B_{12}$-adsorptive properties may be obtained. It has been found that resins made from acrylic acid copolymerized with from about 2 to about 16 percent by weight of divinyl benzene are highly efficient. For instance, the product known as Amberlite XE89, which is manufactured by the Rohm & Haas Company and appears to comprise predominantly acrylic acid and about 5 to 15 percent divinyl benzene, and other materials of this nature, are especially valuable for the recovery of vitamin $B_{12}$ values. To the contrary, Amberlite IRC50, a second resin marketed by the Rohm & Haas Company, prepared from methacrylic acid and about 2½–10% divinyl benzene, is not nearly so effective. The difference in effectiveness is in fact so great as to be one of kind rather than of degree.

Not only is the adsorptive capacity for vitamin $B_{12}$ values of the preferred acrylic acid-type resins much higher than that of the Amberlite IRC50-type resin, but the rate of adsorption is also a great deal higher. This is of the greatest importance in the large-scale recovery of the vitamin. Economical operation of such a process requires adsorption of a high percentage of the vitamin from a dilute, impure solution with a very short contact time between the resin and the vitamin solution. This permits high flow rates through the resin bed of column-type apparatus. If the rate of adsorption and the capacity are not high, a considerably higher amount of resin must be used for the recovery of the vitamin in a given volume of solution. Furthermore, the equipment used must be larger in capacity. The rate of elution of the preferred type resins is a great deal higher than that of the Amberlite IRC50-type resin. This makes it possible to use certain efficient basic eluting agents for the recovery of the vitamin which cannot be used efficiently in eluting the vitamin from the Amberlite IRC50-type resin without appreciable destruction of the activity. The preferred eluting agents are described in more detail below.

Preparation of the ion exchange resins contemplated for use in this new process may be achieved by bulk polymerization of acrylic acid with a suitable proportion of divinyl benzene in the presence of a peroxide catalyst, such as benzoyl peroxide. Alternatively, the material may be made in the beadlet form by polymerizing a suspension of the reactants. Since acrylic acid is miscible with water, it is then necessary to use an ester of it like ethyl acrylate, rather than the acid. The addition of a solution of a salt, such as sodium chloride or sodium sulfate, to suppress solubility of the reactants, is also advisable. In conducting the bead-type polymerization, it is best to include an agent like magnesium carbonate which tends to coat the liquid beadlets and prevent their coalescence during the polymerization. This coating is readily removed after polymerization has been completed and, if an ester of acrylic acid has been employed for the reaction, the ester group can finally be saponified to yield the desired carboxylic acid ion exchange resin. The procedure followed in each case is well known in the resin art and need not be described in greater detail here. However, it should be emphasized that these particular products are unique in their ability to adsorb vitamin $B_{12}$ values from highly dilute impure solutions of the vitamin, enabling the recovery of this valuable mataerial from sources which are otherwise difficult to utilize.

It has been found that the carboxylic acid ion exchange resins of use in our invention have the unique property of adsorbing vitamin $B_{12}$ values, e.g. $B_{12}$ itself and related vitamin $B_{12}$-like materials, such as vitamin $B_{12b}$, vitamin $B_{12c}$ and so forth, at pH's in a range where formation of salts with the carboxylic group is practically precluded. Thus, the impure vitaminaceous solutions may have a pH from about 1.5 to about 4.5 and we find a pH of 2.5 to 3.0 particularly satisfactory. If a batch process is used the pH of the liquid in contact with the resin should be between about 1.5 and about 4.5. If a tower or column process is used the solution leaving the tower should have a pH in the same range. A pH of below 1.5 may be used but decomposition of the vitamin is substantial in prolonged runs. It is therefore immediately apparent that the materials do not function in the ordinary, expected manner of ion exchange resins in recovering the vitamins. This has the very highly desirable result of making the adsorption of the vitamin materials selective as compared to the many cations present in the impure solutions generally used as sources of vitamin $B_{12}$. Thus, when a fermentation broth which contains not only appreciable amounts of organic material, but also a considerable proportion of various metallic ions is passed at a low pH over the requisite type of carboxylic acid resin, vitamin $B_{12}$ values are adsorbed with a high degree of selectivity. This property is not displayed in the same degree by other types of resins, even the aforementioned Amberlite IRC50.

The resins of this invention also show a certain selectivity in adsorption of vitamin $B_{12b}$ as compared to vitamin $B_{12}$. If a mixture of these materials is present in a crude source of the vitamin, such as fermentation broth, both of them are adsorbed simultaneously on the resin. However, by overloading the resin it is possible to obtain a degree of separation of the $B_{12}$ and $B_{12b}$. The vitamin $B_{12b}$ tends to be more tenaciously held to the resin in the presence of an excess of the vitamin valued than will vitamin $B_{12}$ itself, especially when the pH is subsequently raised to about 5 to 7. This is particularly true when partially purified mixtures of the vitamin materials are used. It should be noted that the vitamin $B_{12}$ values in fermentation broths may have as much as 80% of its activity as vitamin $B_{12b}$ or some form other than vitamin $B_{12}$ itself. Thus the adsorption of these other forms in addition to vitamin $B_{12}$ is a valuable property of the particular resins preferred for the process of this invention.

The vitamin may be eluted from the resin by means of various basic reagents which serve to increase the pH generally to at least about 7, and preferably to substantially between 7 and 9. In eluting the vitamin, a solution having a pH appreciably higher than 9 may be used as long as the equilibrium pH is in the preferred range.

If a tower process is used, the solution leaving the tower should have a pH of at least 7. A pH appreciably higher than 9 will cause decomposition of some of the vitamin. Particularly useful are solutions of alkali metal hydroxides, such as sodium hydroxide or potassium hydroxide, and ammonium hydroxide is especially preferred. In addition, various strong organic bases, such as pyridine, piperidine, ethylenediamine or the salts thereof with weak acids may be used. An additional class of eluting agents is basic salts (salts of strong base and weak acid) such as sodium acetate, potassium acetate, sodium cyanide, lithium propionate, and so forth.

The eluted vitamin may be recovered in dry form from the concentrates obtained as described above by various conventional means, if desired. For instance, the solvent may be evaporated to dryness after adjustment of the pH within a range where the stability of vitamin $B_{12}$ is high. Alternatively, the solution may be dried from the frozen state or may be subjected to further extraction procedures to obtain more highly purified products or even crystalline material. The product obtained by eluting the resin adsorbate is of very much higher purity than is the vitamin present in the crude sources, such as fermentation broth. In fact, the eluted material may be used directly for therapeutic purposes as long as any toxic solvent is removed. Sometimes, too, the resin adsorbate is useful directly without neutralization and/or elution. If desired, adsorption on the same type of resin and elution may be repeated to obtain a product of increased purity.

The very great effectiveness of the special class of carboxylic acid ion exchange resins in recovery of vitamin $B_{12}$ values may be seen by comparison of the volume of fermentation broth from which the vitamin can be practically completely removed by means of one unit volume of various given resins under comparable conditions. In such a test conducted with fermentation broth containing approximately 500 mcg. of vitamin $B_{12}$ per liter of solution at a pH of 2.5 to 3.0, it was possible to adsorb the vitamin from 100 to 200 volumes of the fermentation liquor on one volume of Amberlite XE89 (wet), whereas with various other resins, such as Amberlite IRC50, Amberlite IR1 (a phenolformaldehyde sulfonic acid polymer), Dowex 50 (a polystyrene sulfonic acid polymer crosslinked with divinyl benzene), and so forth, only at most 5 to 6 volumes of the same fermentation broth could be effectively treated at the same rate with one volume of resin to remove the vitamin present.

Many crude sources of vitamin $B_{12}$ may be used in our process. Especially good results are realized in treating fermentation broths obtained by cultivating various Streptomyces, some of which are for the direct production of vitamin $B_{12}$ alone and others of which are used for the simultaneous production of an antibiotic and vitamin $B_{12}$. One source of the vitamin which is particularly useful is *Streptomyces griseus* broth from which co-produced streptomycin has been removed, say by alkaline adsorption with a conventional ion exchange resin, such as Amberlite IRC50. Since such resin treatment is effective only on the antibiotic content and not the vitamin, the "sewer liquor" obtained from the streptomycin resin tower is then treated in a resin tower filled with one of the specifically useful resins for recovery of the vitamin. As pointed out above, we prefer a pH of approximately 2.5 to 3.0 for this step, although pHs somewhat higher or lower than this value may also be used. It is thus usually necessary to adjust the pH of the sewer liquor from the streptomycin-adsorption before subjecting it to the vitamin-operation of this invention.

A tower process may be used most conveniently for the recovery of the vitamin. A particular procedure which has been used very successfully is as follows. Three towers are packed with Amberlite XE89. The vitamin $B_{12}$ value containing fermentation product is passed through the first tower in which the resin is in the acid form. The majority of the vitamin is adsorbed here. The effluent is passed through a second tower in which the resin has previously been eluted with an alkaline agent, preferably ammonium hydroxide. Practically all of the remainder of the vitamin is adsorbed here. The acidic effluent from the first tower removes part of the base from the second tower and the vitamin is adsorbed. After the first tower has adsorbed its capacity of the vitamin, it is removed from the stream. The second tower having been completely converted to the acid form is used as the first tower. A third tower which is in the basic form is then used as the second tower. The first tower is eluted with an alkaline reagent to recover the vitamin and is then used as the second tower for adsorption. In this method two towers are always being used for adsorption, the first in acidic form and the second initially in basic form. The third tower is being eluted during the adsorption run of the other two towers. This method results in very efficient recovery of large volumes of vitamin with the minimum of equipment and ion exchange resin.

If a vitamin $B_{12}$-streptomycin producing strain of *S. griseus* is used to prepare the fermentation broth, the broth may be filtered, preferably at an acidic pH. After adjusting the pH to about 7.5 the antibiotic may be recovered by adsorption on Amberlite IRC50-type resin. In this process, the pH of the solution is somewhat lowered. After adjustment to about pH 2.5 to 3.0 the vitamin $B_{12}$ values may be recovered by adsorption on the Amberlite XE89-type resin. Alternatively, the vitamin may first be recovered by adsorption on the preferred resin and then the antibiotic on the Amberlite IRC50-type resin. The fact that the two products may be recovered in good yield in either order, that is, $B_{12}$ first or second, indicates the remarkable selectivity of the resins and the remarkable difference in their properties with regard to these two products. This contrast in properties is most unexpected and highly useful.

The following examples are given by way of illustration and are not to be considered at the sole embodiments of this invention. It is to be understood that protection hereof is only to be limited by the specific wording of the appended claims.

EXAMPLE I

The ease of recovery of vitamin $B_{12b}$ in the presence of high concentrations of a variety of inorganic salts may be seen from the following experiment. An aqueous solution was prepared containing 12,500 mcgs. of vitamin $B_{12b}$, 35.6 grams of potassium chloride, 4.5 grams of sodium chloride, 4.7 grams of calcium chloride and 3.15 grams of magnesium chloride. The mixture was diluted up to one liter with water. A portion of the solution was passed down through beds of various ion exchange resins at a space velocity of about 0.03 ml. per minute per ml. of resin. Vitamin $B_{12}$ activity of the solutions exiting from the beds was then tested, to determine whether vitamin values had been adsorbed by the resin. The following table gives the results obtained with these resins:

| Resin | Result |
| --- | --- |
| 1. Dowex 50 (containing 8% DVB)[1]—Hydrogen form. | No adsorption. |
| 2. Dowex 50 (containing 8% DVB)—Sodium form | Do. |
| 3. Decalso (Synthetic Zeolite) | Do. |
| 4. Dowex 50 (containing 2% DVB)—Sodium form | Some adsorption but leakage of vitamin. |
| 5. Amberlite XE89—Sodium form | No adsorption. |
| 6. Amberlite XE89—Hydrogen form | Excellent adsorption—no leakage. |
| 7. Amberlite IRC50—Hydrogen form | Adsorption considerably less than 6 and leakage. |

[1] DVB is divinyl benzene.

It was found that after 17.5 volumes of the solution had been applied to one volume of XE89 hydrogen form resin there was still no vitamin activity passing out of the column. The pH of the effluent ranged from 2 to 2.3.

EXAMPLE II

A sample of filtered Streptomyces fermentation broth (280 mls.) containing 1500 mcgs. of vitamin $B_{12}$ per liter was passed through a glass column containing 9.4 mls. of Amberlite XE89 in the hydrogen form. The solution was passed through the column at a space velocity of 0.05 per minute. A dark brown band formed at the top of the column and reached about half way down the column at the end of the run. The pH of the broth used was 5 and the effluent had a pH of 3. The vitamin was eluted from the column with a solution of ammonium chloride at a pH of 7.0. The eluted material was further purified by treatment with cyanide and by means of solvent extraction. A solution having a clear pink color was obtained. This product, which assayed about 200,000 units per gram, was obtained in a yield of 72% based on the amount of vitamin $B_{12}$ values in the original fermentation broth.

EXAMPLE III

A study was made of the effect of pH on the adsorption of vitamin $B_{12}$ and vitamin $B_{12b}$ on Amberlite XE89 in the hydrogen form. Weighed samples of the resin were added to 15-milliliter volumes of vitamin $B_{12}$ or vitamin $B_{12b}$ solutions which had been adjusted to the desired pH. The concentrations of the vitamins in each case were about 30 mcg./ml. About 5 mgs. of the resin were used for each test in order that an excess of the vitamin would be present.

*Adsorption of vitamin $B_{12}$*

| pH | Efficiency of Adsorption | Vitamin $B_{12}$ Left in Solution (mcg./ml.) |
|---|---|---|
| 1.1 | 1,090 | 22.7 |
| 2.0 | 930 | 24.2 |
| 3.0 | 662 | 25.7 |
| 3.7 | 1,010 | 25.4 |
| 4.1 | 830 | 25.6 |
| 4.6 | 640 | 26.1 |
| 4.8 | 820 | 25.6 |

*Adsorption of vitamin $B_{12b}$*

| pH | Efficiency of Adsorption | Viatmin $B_{12b}$ Left in Solution (mcg./ml.) |
|---|---|---|
| 1.2 | 702 | 24.2 |
| 2.0 | 1,250 | 20.8 |
| 2.4 | 1,600 | 19.9 |
| 3.6 | 15,600 | 5.4 |
| 4.3 | 39,200 | 2.45 |
| 5.4 | 39,200 | 2.45 |

In the above tables, efficiency of adsorption is measured by the ratio of the micrograms of vitamin adsorbed per gram of resin to the micrograms per milliliter of vitamin in solution. It will be noted that the proportion of vitamin adsorbed from solution mounts quite rapidly with pH in the case of vitamin $B_{12b}$, whereas vitamin $B_{12}$ adsorption does not increase with rising pH but stays at about the same level.

EXAMPLE IV

A glass column, 19 mm. in inside diameter and containing water-wet Amberlite XE89 in the hydrogen form to a height of about 7 centimeters, was used for adsorption of vitamin $B_{12}$. Filtered fermentation broth containing 1200 micrograms of vitamin $B_{12}$ activity per liter and having a volume of 3500 milliliters was passed through the column at a space velocity of about 0.1 per minute. The pH of the broth entering the column was 3.0. The material leaving the column was collected in fractions and each of these fractions was checked for pH, total solids, and vitamin activity. The following table summarizes the results:

| Fraction, ml. | pH | Total Solids, mg./ml. | Bioassay, mcg./liter |
|---|---|---|---|
| Broth | 3.0 | 17.7 | 1,200 |
| 1. 0–240 | 2.9 | 14.6 | 17 |
| 2. 240–485 | 3.0 | 16.4 | 14 |
| 3. 485–810 | 3.1 | 17.0 | 23 |
| 4. 810–2,210 | 3.1 | 18.1 | 27 |
| 5. 2,210–2,640 | 3.1 | 17.4 | 28 |
| 6. 2,640–3,015 | 3.1 | 17.6 | 27 |
| 7. 3,015–3,435 | 3.0 | 14.2 | 39 |

It will be noted from this table that there was no appreciable decrease in adsorption of the vitamin; even after 175 volumes of fermentation broth had been passed through the column containing only one volume of resin, 98% of the total vitamin added to the column was adsorbed.

The vitamin was eluted by removing the resin from the column, adding it to 150 mls. of water and adjusting the pH to 7.5–8.0 with ammonium hydroxide. After stirring for two hours, the resin was filtered and washed with a small volume of water. The total volume of eluate was 160 mls. It assayed 18.75 mcgs. of vitamin per ml. Thus, 75% of the vitamin adsorbed on the column was eluted by simply washing once with ammonium hydroxide. The product, when dried, assayed over 1500 mcgs./gram.

EXAMPLE V

Vitamin $B_{12}$ fermentation broth was treated just as in Example IV, except that 3850 mls. or 190 resin volumes of broth assaying 1450 mcgs. of vitamin activity per liter was used. The regenerated resin from Example IV was used for adsorption, and the resin adsorbate was eluted in the same way, using 250 mls. of water adjusted to pH 8.9 with ammonium hydroxide. After filtering the resin and rinsing it with water, the pH of the eluate was adjusted to 6.0. A total of 82.3% of the vitamin $B_{12}$ activity contained in the original fermentation broth was recovered. This material was treated with cyanide, extracted with benzyl alcohol and re-extracted into water. The water phase was washed with butanol and the product was re-extracted into 2-ethylbutyric acid. After finally extracting into water, the product was obtained as a clear pink, stable solution containing a highly potent concentrate of vitamin $B_{12}$. Yields of over 50% of the amount of vitamin $B_{12}$ activity in the original broth were obtained. This material was completely in the form of vitamin $B_{12}$ itself.

EXAMPLE VI

The same resin used in the above example, regenerated in the acid form, was placed in a glass column. Through the column was passed 1012 mls. of a Streptomyces griseolus fermentation broth, assaying 1280 mcgs. of vitamin $B_{12}$ activity per liter. The broth used was fifty-one times the volume of the resin, and it was adjusted to a pH of 1.8 before passing through the column. The effluent from the column was assayed as in previous cases. Practically all of the vitamin had been adsorbed. The vitamin was eluted from the resin column by passing through it a 3% solution of sodium cyanide adjusted to a pH of 9.0 with hydrochloric acid. A total of 425 mls. of eluate was obtained. The sodium cyanide solution was passed through the column until no further color was removed. The eluate was allowed to stand for four hours, and it was then further purified by extraction with benzyl alcohol, re-extraction into water, and so forth. A concentrate having a volume of 24 mls. was obtained. This material assayed 32.6 mcgs. of vitamin $B_{12}$ per ml. A yield of 63.2% based on the total vitamin $B_{12}$ activity in the broth was obtained. In the procedure of this example, not only is the vitamin eluted from the column with the alkaline solution, but, at the same time, various vitamin $B_{12}$-variants, such as vitamin $B_{12b}$ and so forth, are simultaneously converted to vitamin $B_{12}$ itself.

EXAMPLE VII

One hundred grams of ethyl acrylate (previously washed with one-quarter volume of 5% aqueous sodium hydroxide three times to remove inhibitor) was added to a one-liter flask containing 400 milliliters of water. The flask was equipped with a thermometer, an addition funnel, a 1/18-horsepower stirrer with a glass propeller and a baffle beneath the surface of the liquid to assure turbulent agitation. Five grams of technical divinyl benzene (40% pure), 2 grams of magnesium carbonate and 0.25 grams of benzoyl peroxide were added successively. The mixture was heated to 80° C. with stirring and it was then held at 77–85° C. for three hours. By this time the unsaturated ester had polymerized into fine, spherical, non-coalescing beadlets. The mixture was allowed to cool and the beadlets were filtered. The beadlets were washed with a small volume of water and then placed in a solution containing 150 mls. of concentrated sodium hydroxide solution (40 grams of sodium hydroxide per 100 mls. of water) and 150 mls. of ethanol. The mixture was refluxed for 36 hours. The product was filtered and the cake was washed with water. The polyacrylic acid-divinyl benzene beadlets were then stirred with 300 mls. of 6-Normal hydrochloric acid for one hour in order to convert the resin to the acid cycle. The cake was then washed with water, slurried in 300 mls. of water, refiltered and washed again with water. This product was found to be slightly more effective in the recovery of vitamin $B_{12}$ than is the commercially-available Amberlite XE89 resin. This acrylic acid-divinyl benzene copolymer contains about 2.8% by weight of the divinyl compound and 97.2% of the acid.

EXAMPLE VIII

A second acrylic acid-divinyl benzene copolymer ion-exchange resin was prepared in the same manner as described directly above, except that 200 grams of ethyl acrylate, 20 grams of 40% divinyl benzene, 4 grams of magnesium carbonate and 0.25 gram of benzoyl peroxide were used. The resulting ethyl acrylate-divinyl benzene copolymer was saponified by means of strong aqueous-alcoholic sodium hydroxide just as described above. The product obtained after acidification and washing contained approximately 5.6% of divinyl benzene on the anhydrous basis. This polymer was found to be very active in the recovery of vitamin $B_{12}$, even from dilute solutions of very low purity.

EXAMPLE IX

A resin prepared by copolymerizing ethyl acrylate and divinyl benzene in the presence of benzoyl peroxide was hydrolyzed to obtain the free carboxylic acid form of the ion exchange resin. The finished product contained about 5% of divinyl benzene on a dry basis. Twenty-five milliliters of the wet hydrogen form of the resin was placed in a glass column. The *Streptomyces griseus* fermentation broth from which the streptomycin had been removed by adsorption on Amberlie IRC50 ion exchange resin was adjusted to pH 3.0 with sulfuric acid. This solution on assay was found to contain 370 mcgs. of vitamin $B_{12}$ values per liter. 2600 mls. of the solution were passed at a rate of 0.1 cc. per minute per cc. of resin through a glass column. Seventy percent of the vitamin $B_{12}$ was adsorbed on the resin. The vitamin was eluted by means of 217 mls. of 0.75-Normal ammonium hydroxide solution. The concentrate of vitamin that was obtained contained 60% of the vitamin originally present in the fermentation broth. The material was dried and found to have a potency of 800 mcgs. of vitamin $B_{12}$ activity per gram of solids.

What is claimed is:

1. A process for concentrating vitamin $B_{12}$ values which comprises contacting an impure, acidic solution of said values at a pH of from about 1.5 to about 4.5 with a synthetic ion exchange resin consisting of acrylic acid copolymerized with from about 2 to about 16 percent by weight of divinyl benzene, and eluting the vitamin $B_{12}$ values from said resin with an aqueous solution of an alkaline reagent selected from the class consisting of alkali metal hydroxides, ammonium hydroxide, and the ammonium and alkali metal salts of weak acids.

2. A process for the recovery of vitamin $B_{12}$ values which comprises contacting a filtered Streptomyces fermentation broth at a pH of substantially between 1.5 and 4.5 with a resin consisting of acrylic acid copolymerized with from about 2 to about 16 percent by weight of divinyl benzene and eluting the vitamin $B_{12}$ values therefrom at a pH of at least about 7 with an aqueous solution of ammonium hydroxide.

3. A process as claimed in clam 2 wherein the acrylic acid-divinyl benzene copolymer is contained in two towers the first of which is in the acid form and the second of which is at least partially in salt form.

4. A process for recovering vitamin $B_{12}$ values which comprises contacting an impure, acidic solution of said values at a pH of from about 2 to about 3 with a synthetic ion exchange resin consisting of acrylic acid copolymerized with from about 2 to about 10 percent by weight of divinyl benzene, and eluting the vitamin $B_{12}$ values from said resin with an aqueous alkaline solution at a pH sufficient to convert the resin to the salt form.

References Cited in the file of this patent

UNITED STATES PATENTS

| | | |
|---|---|---|
| 2,563,794 | Rickes | Aug. 7, 1951 |
| 2,582,589 | Fricke | Jan. 15, 1952 |
| 2,628,185 | Shive | Feb. 10, 1953 |

OTHER REFERENCES

Amber-Hi-Lites, published by Rohm and Haas, number 3, August 1949, first page.